US011888241B2

(12) United States Patent
Sone

(10) Patent No.: US 11,888,241 B2
(45) Date of Patent: Jan. 30, 2024

(54) ANTENNA DEVICE

(71) Applicant: YOKOWO CO., LTD., Tokyo (JP)

(72) Inventor: Takayuki Sone, Tomioka (JP)

(73) Assignee: YOKOWO CO., LTD., Tokyo (JP)

( * ) Notice: Subject to any disclaimer, the term of this patent is extended or adjusted under 35 U.S.C. 154(b) by 0 days.

(21) Appl. No.: 17/568,725

(22) Filed: Jan. 5, 2022

(65) Prior Publication Data

US 2022/0131272 A1 Apr. 28, 2022

Related U.S. Application Data

(63) Continuation of application No. 16/487,096, filed as application No. PCT/JP2018/007479 on Feb. 28, 2018, now Pat. No. 11,251,528.

(30) Foreign Application Priority Data

Feb. 28, 2017 (JP) ................................ 2017-037653

(51) Int. Cl.
*H01Q 9/04* (2006.01)
*H01Q 1/36* (2006.01)

(52) U.S. Cl.
CPC ............ *H01Q 9/0407* (2013.01); *H01Q 1/36* (2013.01)

(58) Field of Classification Search
CPC .......... H01Q 1/22; H01Q 1/3275; H01Q 1/36; H01Q 11/08; H01Q 13/08; H01Q 21/28; H01Q 5/385; H01Q 5/40; H01Q 9/0407; H01Q 9/36
See application file for complete search history.

(56) References Cited

U.S. PATENT DOCUMENTS 5,402,134 A 3/1995 Miller et al.
5,778,306 A 7/1998 Kommrusch
6,518,934 B1 2/2003 Knowles et al.
(Continued)

FOREIGN PATENT DOCUMENTS

CN 103548199 A 1/2014
JP 2010-21856 A 1/2010
(Continued)

OTHER PUBLICATIONS

International Search Report and Written Opinion dated Apr. 24, 2018 for PCT/JP2018/007479 filed on Feb. 28, 2018, 6 pages including English Translation of the International Search Report.
(Continued)

*Primary Examiner* — Thien M Le
(74) *Attorney, Agent, or Firm* — XSENSUS LLP

(57) ABSTRACT

An antenna device includes a patch antenna serving as a first antenna; and a second antenna including capacitance loading elements, the capacitance loading elements being located above the patch antenna and also arranged separately in a predetermined direction. Also, an antenna device includes a patch antenna serving as a first antenna; and a second antenna including capacitance loading elements, the capacitance loading elements being located above the patch antenna, and a slit-like cutout part in a predetermined direction being formed in at least one of side edges of the capacitance loading elements.

19 Claims, 14 Drawing Sheets

(56) References Cited

U.S. PATENT DOCUMENTS

| | | | | |
|---|---|---|---|---|
| 6,603,430 | B1 * | 8/2003 | Hill .......................... | H01Q 9/42 343/702 |
| 9,225,055 | B2 | 12/2015 | Kaneko | |
| 10,276,927 | B2 | 4/2019 | Ohno et al. | |
| 2002/0033770 | A1 * | 3/2002 | Akiyama ............. | H01Q 9/0435 343/702 |
| 2004/0087341 | A1 * | 5/2004 | Edvardsson ......... | H01Q 9/0421 455/562.1 |
| 2008/0303633 | A1 * | 12/2008 | Cheng .............. | G06K 19/07749 340/10.1 |
| 2010/0156600 | A1 * | 6/2010 | Duron .................... | H01Q 13/10 343/861 |
| 2010/0231461 | A1 | 9/2010 | Tran | |
| 2010/0265147 | A1 | 10/2010 | Wakui et al. | |
| 2012/0026050 | A1 | 2/2012 | Sampo et al. | |
| 2012/0050130 | A1 * | 3/2012 | Nishioka .............. | H01Q 1/2225 343/867 |
| 2012/0326934 | A1 | 12/2012 | Wakui et al. | |
| 2012/0326935 | A1 | 12/2012 | Kang et al. | |
| 2013/0176180 | A1 | 7/2013 | Wakui et al. | |
| 2013/0229315 | A1 | 9/2013 | Duzdar et al. | |
| 2014/0125531 | A1 | 5/2014 | Kaneko et al. | |
| 2015/0200446 | A1 | 7/2015 | Kaneko | |
| 2016/0294056 | A1 | 10/2016 | Manteghi et al. | |
| 2017/0093028 | A1 | 3/2017 | Tashiro | |
| 2017/0199134 | A1 * | 7/2017 | LoVetri ................ | A61B 5/0536 |
| 2019/0280372 | A1 * | 9/2019 | Terashita ............... | H01Q 21/28 |

FOREIGN PATENT DOCUMENTS

| | | | |
|---|---|---|---|
| JP | 2012-34226 | A | 2/2012 |
| JP | 2014-112828 | A | 6/2014 |
| JP | 2015-84575 | A | 4/2015 |
| JP | 2016-32165 | A | 3/2016 |

OTHER PUBLICATIONS

Extended European Search Report dated Apr. 24, 2020 in European Patent Application No. 18760255.2, 10 pages.

Japanese Office Action dated Dec. 21, 2021 in Japanese Application No. 2020-055667.

* cited by examiner

1: ANTENNA DEVICE

20: PATCH ANTENNA

30: ANTENNA FOR AM/FM BROADCAST RECEPTION 41,42,43: CAPACITANCE LOADING ELEMENT

ANTENNA DEVICE

CROSS-REFERENCE TO RELATED APPLICATIONS

The present application is a continuation of U.S. Ser. No. 16/487,096 filed on Aug. 20, 2019, which is based on PCT filing PCT/JP2018/007479, filed Feb. 28, 2018, which claims priority to JP 2017-037653, filed Feb. 28, 2017, the entire contents of each are incorporated herein by reference.

TECHNICAL FIELD

The present invention relates to an antenna device including a patch antenna and a capacitance loading element that constitutes another antenna (for example, an antenna for AM/FM broadcast reception) that is different from this patch antenna.

BACKGROUND ART

In a related-art antenna device of this type, to reduce influences of a capacitance loading element on a patch antenna, the capacitance loading element and the patch antenna are arranged so as not to be overlapped with each other as observed from the zenith (above). However, since down-sizing of the antenna device has been demanded in recent years, arrangement of the capacitance loading element above the patch antenna is under review. This case is illustrated in FIGS. 16A to 16D as a comparative example.

An antenna device 11 in the comparative example in FIGS. 16A to 16D includes a patch antenna 20 serving as a first antenna mounted on an antenna base that is not illustrated in the drawings and an antenna 30 for AM/FM broadcast reception serving as a second antenna including a capacitance loading element 40 and a helical element (coil) 70. The capacitance loading element 40 is an undivided structure continuous in a front-rear direction (longitudinal direction) and is located above the patch antenna 20. The patch antenna 20 is constituted by providing a radiating electrode 22 on an upper surface of a dielectric substrate 21 arranged on a ground conductor (not illustrated), and a side where the radiating electrode 22 is provided corresponds to an upper side of the patch antenna 20. In FIG. 16A, front-rear, left-right, and vertical directions are defined. The front-rear direction is a longitudinal direction (direction of a ridge line P) of the capacitance loading element 40. The left-right direction is a direction orthogonal to the front-rear direction on a horizontal plane, in which a left side corresponds to a left direction when facing the front. The vertical direction is a direction orthogonal to both the front-rear and left-right directions, in which a side where the radiating electrode 22 of the patch antenna 20 is provided corresponds to an upward direction.

The capacitance loading element 40 is, for example, a conductive metal plate and is chevron-shaped including slant faces that are lowered towards left and right from the ridge line P at a highest position, in which an angle defined by both slant faces is $\alpha=70°$. A length of the capacitance loading element 40 (length in the front-rear direction) is j=80 mm, and widths of the slant faces on the right side and the left side (lengths along the slant faces in the left-right direction) are k=m=22.5 mm. A height from the antenna base that is not illustrated in the drawings to the ridge line P is approximately 50 mm, and an interval z between an upper surface of the patch antenna 20 and a lower end of the capacitance loading element 40 in FIG. 16C is approximately 24 mm.

When the capacitance loading element 40 of the undivided structure is simply arranged above the patch antenna 20 as in the comparative example in FIGS. 16A to 16D, an axial ratio (dB) of the patch antenna 20 increases to decrease an average gain, and reception performance from broadcast or communication satellites decreases.

FIG. 17 is a characteristic diagram based on a simulation illustrating a relationship between a frequency (MHz) of the antenna device and an axial ratio at an elevation angle 90° (hereinafter, referred to as an axial ratio) when the capacitance loading element is arranged above the patch antenna as in the comparative example in FIGS. 16A to 16D and when the capacitance loading element is not arranged. As illustrated in FIG. 17, the axial ratio increases when the capacitance loading element is arranged above the patch antenna (solid line in FIG. 17) as compared with a case where the capacitance loading element is not arranged (dotted line in FIG. 17). That is, performance of the patch antenna with respect to a circularly polarized wave decreases. Here, it is assumed that the elevation angle indicates an angle from the horizontal plane.

RELATED-ART DOCUMENT

Patent Document

Patent Document 1: JP-A-2016-32165

Patent Document 1 illustrates an antenna device for vehicle that includes a satellite radio antenna and a capacity element (equivalent to a capacitance loading element). The satellite radio antenna is arranged on a front side with respect to the capacity element, and this is an arrangement where the capacity element and the satellite radio antenna are not overlapped with each other as observed from the above.

SUMMARY OF THE INVENTION

Technical Problem

As described above, when the capacitance loading element is simply arranged above the patch antenna, characteristics of the patch antenna decrease in a case where circularly polarized radio waves from broadcast or communication satellites are transmitted and/or received.

Embodiments according to the present invention are related to providing a technology for an antenna device with which transmission and/or reception of circularly polarized waves by a patch antenna may be satisfactorily performed irrespective of the presence of a capacitance loading element.

Solution to Problem

A first aspect is an antenna device. This antenna device includes a patch antenna serving as a first antenna, and a second antenna including capacitance loading elements, the capacitance loading elements being located above the patch antenna and also arranged separately in a predetermined direction.

It is sufficient when an electrical length in the predetermined direction of each capacitance loading element and an electrical length in a direction orthogonal to the predetermined direction are substantially equal to each other.

It is sufficient when the capacitance loading elements arranged separately in the predetermined direction are mutually connected by a filter that becomes high impedance in a frequency band where the patch antenna operates.

It is sufficient when the capacitance loading elements are arranged separately at an equal length in the predetermined direction.

A second aspect is also an antenna device. This antenna device includes a patch antenna serving as a first antenna, and a second antenna including capacitance loading elements, the capacitance loading elements being located above the patch antenna, and a slit-like cutout part in a predetermined direction being formed in at least one of side edges of the capacitance loading elements.

It is sufficient when the capacitance loading elements have a ridge line in the predetermined direction, and slit-like cutout parts are respectively formed on the side edges of the capacitance loading elements in the predetermined direction so as to include an extended line of the ridge line.

An arbitrary combination of the above-referenced components and expressions of the present invention that has been altered between methods, systems, and the like are also effective as the aspects of the present invention.

Advantageous Effects of Invention

In accordance with the first aspect and the second aspect, in a case where the patch antenna serving as the first antenna and the second antenna including the capacitance loading elements located above the patch antenna are provided, since the capacitance loading elements are arranged separately in the predetermined direction (longitudinal direction) or when the slit-like cutout part in the predetermined direction (longitudinal direction) is formed in at least one of the side edges of the capacitance loading elements, transmission and/or reception of circularly polarized waves by the patch antenna may be satisfactorily performed.

DESCRIPTION OF EMBODIMENTS

Hereinafter, embodiments will be described in detail with reference to the drawings. The same or equivalent components, parts, processes, and the like illustrated in the respective drawings are assigned with the same reference signs, and redundant descriptions will be appropriately omitted. In addition, the embodiments are not intended to limit the present invention and are exemplifications, and all features described in the embodiments and combinations thereof are not necessarily essential to the present invention.

First Embodiment

Figure 1:
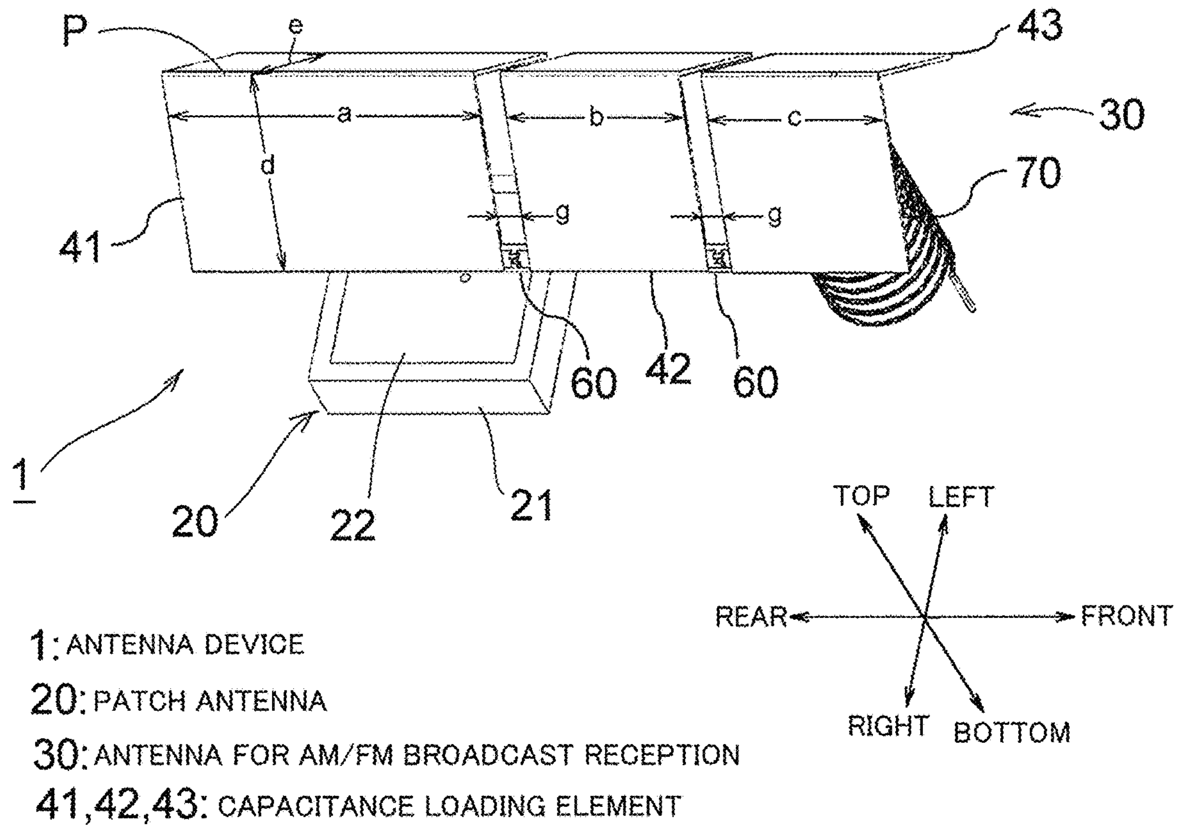
FIG. 1 is a schematic perspective view illustrating a first embodiment.

FIG. 1 is a schematic perspective view of an antenna device according to a first embodiment, in which an antenna device 1 includes a patch antenna 20 serving as a first antenna mounted on an antenna base that is not illustrated in the drawings and an antenna 30 for AM/FM broadcast reception serving as a second antenna including capacitance loading elements 41, 42, and 43 that are arranged (divided) separately in a front-rear direction (longitudinal direction) and a helical element (coil) 70. The patch antenna 20 is a GPS (Global Positioning System) antenna, an SXM (Sirius XM) antenna, a GNSS (Global Navigation Satellite System) antenna, or the like that receives circularly polarized waves from broadcast or communication satellites or transmits circularly polarized waves. The capacitance loading elements 41, 42, and 43 and the helical element 70 are components of the antenna for AM/FM broadcast reception. In FIG. 1, front-rear, left-right, and vertical directions are defined. The front-rear direction is an array direction of the capacitance loading elements 41, 42, and 43 (direction of a ridge line P of each capacitance loading element). The left-right direction is a direction orthogonal to the front-rear direction on a horizontal plane, in which a left side when facing the front corresponds to a left direction. The vertical direction is a direction orthogonal to both the front-rear and left-right directions, in which a side where the radiating electrode 22 of the patch antenna 20 is provided corresponds to an upward direction.

The capacitance loading elements 41, 42, and 43 are, for example, conductive metal plates, are chevron-shaped including slant faces that are lowered towards left and right from the ridge line P at a highest position when the antenna base that is not illustrated in the drawings is set as a reference, are located above the patch antenna 20, and are also arranged by being divided into three in the front-rear direction. Herein, meanings of "above" include not only a case where the patch antenna 20 is completely overlapped with the capacitance loading elements 41, 42, and 43 when observed from the above of the antenna device 1 but also a case where part of the patch antenna 20 is overlapped with the capacitance loading elements 41, 42, and 43. The respective capacitance loading elements 41, 42, and 43 are mutually connected by a filter 60 at ends on a right side when facing the front. A shape and dimensions of the capacitance loading elements 41, 42, and 43 before the division are set to be comparable with those of the capacitance loading element 40 in the comparative example in FIGS. 16A to 16D. A shape representing clearances between the mutual capacitance loading elements 41, 42, and 43 is a linear shape orthogonal to the array direction of the capacitance loading elements 41, 42, and 43 (that is, the front-rear direction). The helical element 70 is connected, for example, to the capacitance loading element 43 at a front position and is located in the front.

Figure 6:
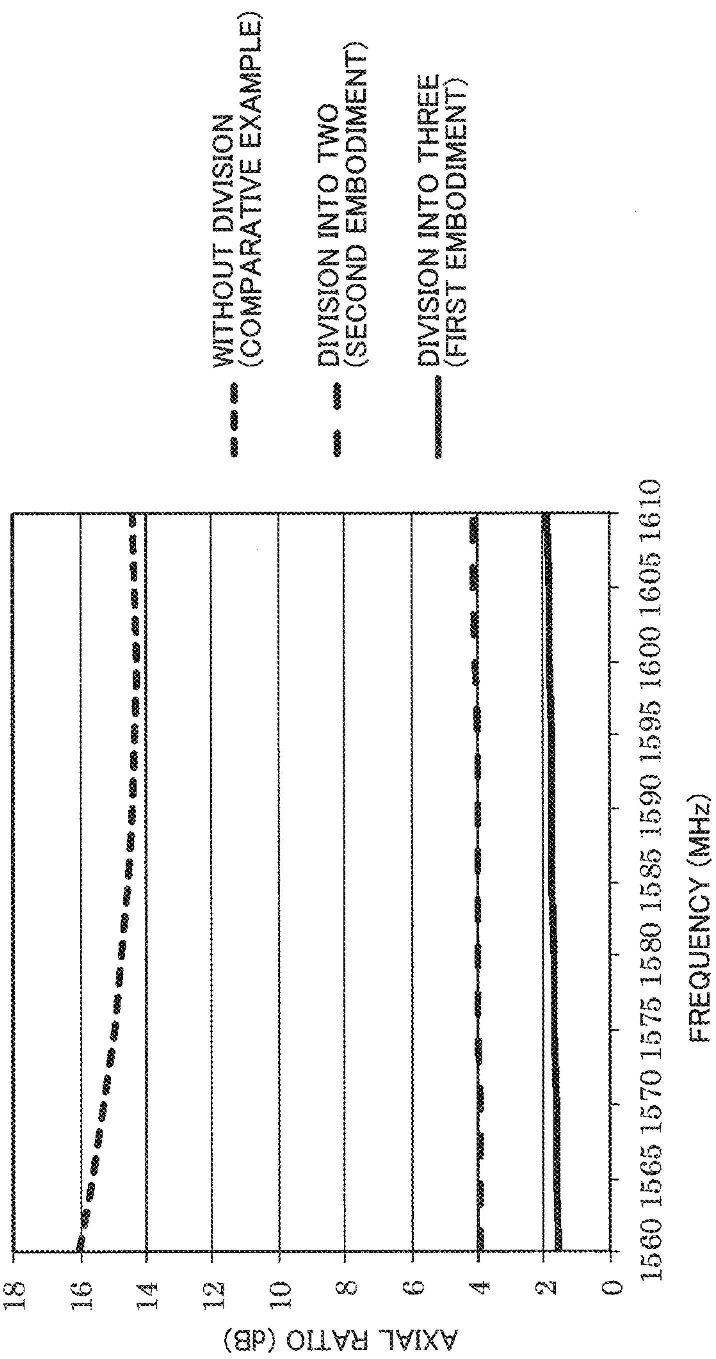
FIG. 6 is a characteristic diagram based on a simulation illustrating a relationship between a frequency and an axial ratio of the antenna device when a capacitance loading element included in an antenna device is divided in a front-rear direction and when the capacitance loading element is not divided.

The filter 60 is a filter obtained by connecting a coil and a capacitance in parallel to each other so that parallel resonance occurs (to become high impedance) in an operating frequency band of the patch antenna 20 (for example, a frequency band including 1560 to 1610 MHz illustrated in FIG. 6 or the like), a filter where a self-resonant frequency of the coil is set in the operating frequency band of the patch antenna 20, or the like. The filter 60 connects the divided capacitance loading elements 41 and 42 to each other and connects the divided capacitance loading elements 42 and 43 to each other. Since the filter 60 is low impedance in an AM/FM broadcast frequency band, all the divided capacitance loading elements 41, 42, and 43 operate as a single conductor together with the helical element 70 in the AM/FM broadcast frequency band. On the other hand, the filter 60 and the helical element 70 are high impedance in the operating frequency band of the patch antenna 20. For this reason, each of the divided capacitance loading elements 41, 42, and 43 impart electromagnetic influences on the patch antenna 20, and characteristics of the patch antenna 20 may change. In a case also where the patch antenna 20 is not overlapped with the capacitance loading elements 41, 42, and 43 when observed from the above, since the capacitance loading elements 41, 42, and 43 may impart any electromagnetic influences on the patch antenna 20, the characteristics of the patch antenna 20 may change.

For reduction in height of the antenna device 1, the intervals between an upper surface of the patch antenna 20 (the radiating electrode 22) and lower ends of the capacitance loading elements 41, 42, and 43 are desirably set to be short. When a wavelength of a center frequency in the operating frequency band of the patch antenna 20 is set as λ, the intervals between the upper surface of the patch antenna 20 and the lower ends of the capacitance loading elements 41, 42, and 43 may be higher than or equal to approximately 0.25λ but is preferably lower than approximately 0.25λ from the viewpoint of the reduction in height.

Second Embodiment

Figure 2:
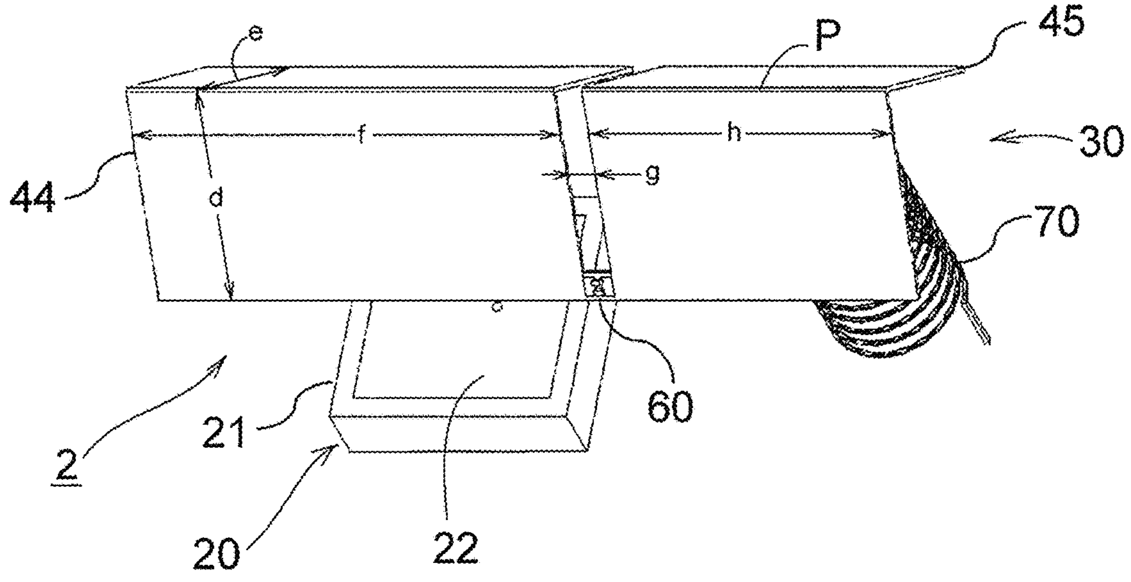
FIG. 2 is a schematic perspective view illustrating a second embodiment.

FIG. 2 is a schematic perspective view of an antenna device according to a second embodiment, in which an antenna device 2 includes capacitance loading elements 44 and 45 that have been divided into two instead of the capacitance loading elements after division into three in the first embodiment. A shape and dimensions of the capacitance loading elements 44 and 45 before the division are set to be comparable with those of the capacitance loading element 40 in the comparative example in FIGS. 16A to 16D. The helical element 70 is connected, for example, to the capacitance loading element 45 in a front position. The other configuration is similar to the above-referenced first embodiment.

FIG. 6 is a characteristic diagram based on a simulation illustrating a relationship between a frequency (MHz) and an axial ratio (dB) of the antenna device when the capacitance loading element is divided in the front-rear direction (the first embodiment in FIG. 1 or the second embodiment in FIG. 2) and when the capacitance loading element is not divided (the comparative example in FIGS. 16A to 16D). From this diagram, the axial ratio considerably decreases in the second embodiment corresponding to the division into two as compared with the case of the comparative example in which the capacitance loading element is not divided, and the axial ratio further decreases in the first embodiment corresponding to the division into three.

Figure 7:
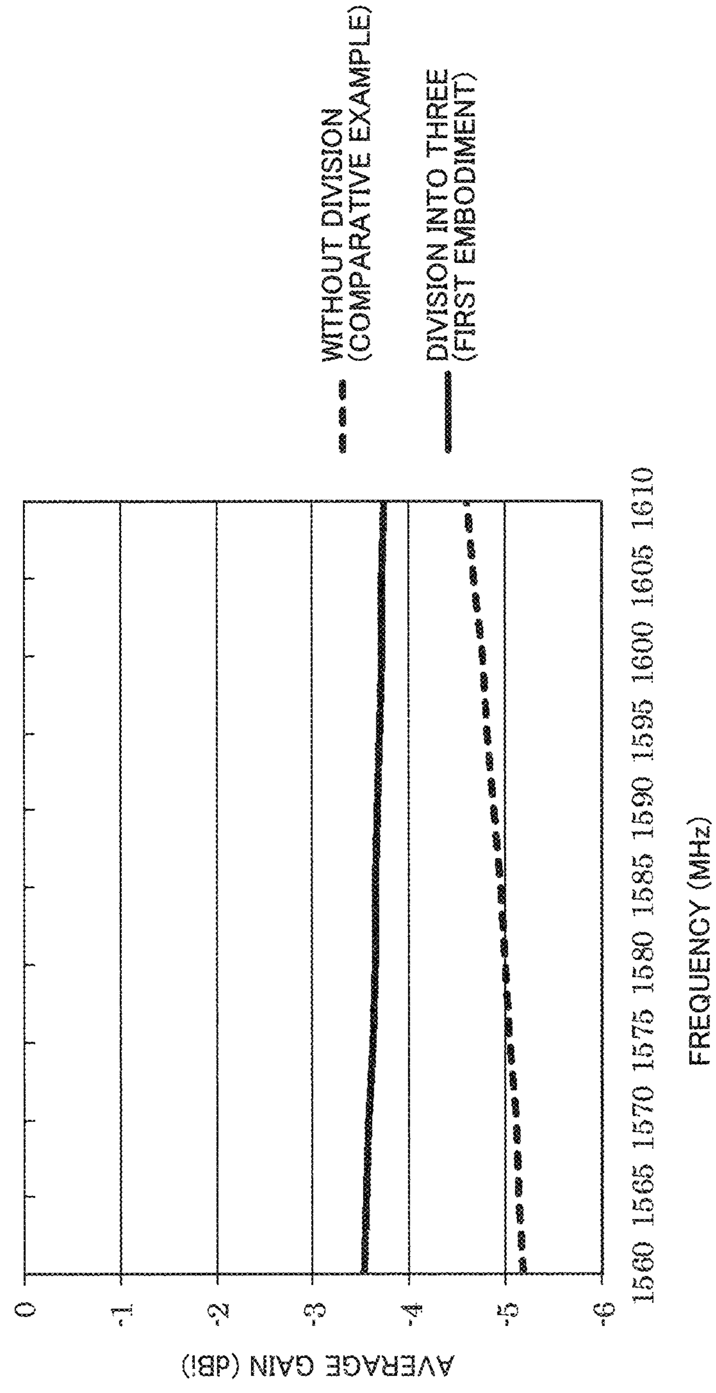
FIG. 7 is a characteristic diagram based on a simulation illustrating a relationship between the frequency and an average gain at an elevation angle 10° of the antenna device when the capacitance loading element is divided in the front-rear direction into three and when the capacitance loading element is not divided.

FIG. 7 is a characteristic diagram based on a simulation illustrating a relationship between the frequency (MHz) and an average gain (dBi) of the antenna device upon circularly polarized wave reception at an elevation angle 10° when the capacitance loading element is divided into three in the front-rear direction (the first embodiment in FIG. 1) and when the capacitance loading element is not divided (the comparative example in FIGS. 16A to 16D). It is understood from this diagram that the average gain increases in the first embodiment corresponding to the division into three as compared with the case of the comparative example in which the capacitance loading element is not divided.

In the characteristic diagrams in FIG. 6 and FIG. 7, when lengths of the capacitance loading elements 41, 42, and 43 in FIG. 1 and the capacitance loading elements 44 and 45 in FIG. 2 in the front-rear direction are set as a, b, c, f, and h, a length along slant faces on the right side with respect to the ridge line P is set as d, and a length along slant faces on the left side is set as e, a=35 mm, b=21 mm, c=20 mm, f=45 mm, h=33 mm are established, and d=e=22.5 mm (same for all the respective capacitance loading elements 41, 42, 43, 44, and 45) is established. It is obtained that a length of the clearances between the capacitance loading elements 41, 42, and 43 and the clearance between the capacitance loading elements 44 and 45 in the front-rear direction is g=2 mm, and an angle defined by the chevron-shaped left and right slant faces of the capacitance loading elements 41 to 45 is the same as the capacitance loading element 40 in FIGS. 16A to 16D. As understood from the relationships among the dimensions a, b, c, f, and h, according to the first embodiment in FIG. 1 and the second embodiment in FIG. 2, the capacitance loading element is not divided at equal lengths in the front-rear direction (not equally divided).

When the capacitance loading element is divided in the front-rear direction as in the first embodiment and the second embodiment, a difference between an electrical length in each of the divided capacitance loading elements 41, 42, and 43 and the divided capacitance loading elements 44 and 45 in the front-rear direction and an electrical length in the left-right direction orthogonal to this front-rear direction decreases, and the axial ratio decreases as illustrated in FIG. 6. In addition, when the electrical length in each of the divided capacitance loading elements in the front-rear direction becomes shorter than a wavelength in the operating frequency band of the patch antenna 20, influences caused by the capacitance loading elements located above the patch antenna 20 on antenna characteristics of the patch antenna 20 are reduced. For this reason, as illustrated in FIG. 7, when the capacitance loading element is divided into three in the front-rear direction, the average gain at a low elevation angle (elevation angle 10°) improves as compared with a case where the capacitance loading element is not divided. When the number of divisions of the capacitance loading element is increased, since the number of filters 60 is increased to increase costs, the number of divisions of the capacitance loading element is desirably set as approximately 3 in a case where the capacitance loading element is not equally divided. In addition, intervals between the upper surface of the patch antenna 20 (radiating electrode 22) and lower ends of the capacitance loading elements 44 and 45 are similar to those of the first embodiment.

In accordance with the above-referenced first embodiment, the following effects may be realized.

(1) In a case where the patch antenna 20 serving as the first antenna and the antenna 30 for AM/FM broadcast reception serving as the second antenna are provided, the capacitance loading elements 41, 42, and 43 (structure of the capacitance loading element divided into three) arranged separately in a predetermined direction (front-rear direction) are used as components of the antenna 30 for AM/FM broadcast reception. For this reason, the axial ratio with respect to the circularly polarized waves may be decreased as compared with the capacitance loading element of the undivided structure. As a result, transmission and/or reception of circularly polarized waves may be satisfactorily performed by the patch antenna 20 irrespective of the presence of the capacitance loading elements 41, 42, and 43 located above the patch antenna 20.

(2) In addition, because of the capacitance loading elements 41, 42, and 43 arranged (divided) separately in the predetermined direction, the average gain in a case where the circularly polarized waves are transmitted and/or received by the patch antenna 20 at the low elevation angle may be satisfactorily maintained as compared with the capacitance loading element of the undivided structure.

(3) The capacitance loading elements 41 and 42 and the capacitance loading elements 42 and 43 arranged separately in the predetermined direction are mutually connected by the filter 60 that become high impedance in the frequency band where the patch antenna 20 operates. Thus, the capacitance loading elements 41, 42, and 43 may be regarded as separate parasitic conductors in the operating frequency band of the patch antenna 20, and it is possible to abbreviate adverse influences on the patch antenna 20 (decrease in the average gain).

In accordance with the second embodiment, since the capacitance loading elements 44 and 45 (structure of the capacitance loading element divided into two) arranged separately in the predetermined direction (front-rear direction) are used as the components of the antenna 30 for AM/FM broadcast reception, action effects pursuant to the first embodiment may be attained.

Third Embodiment

Figure 3:
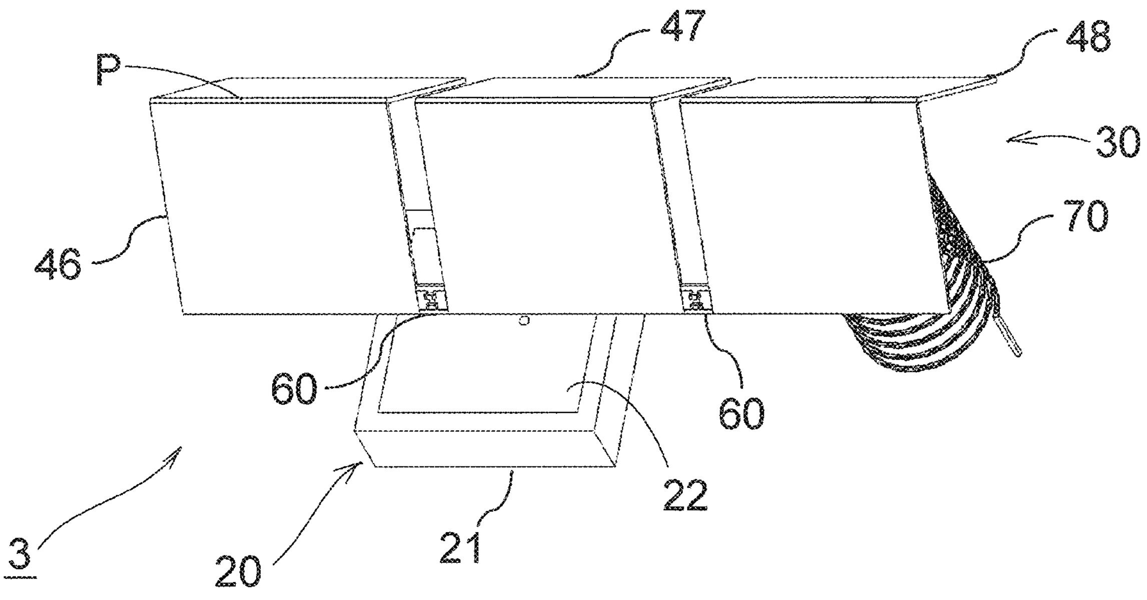
FIG. 3 is a schematic perspective view illustrating a third embodiment.

FIG. 3 is a schematic perspective view of an antenna device according to a third embodiment, in which an antenna device 3 includes capacitance loading elements 46, 47, and 48 that have been divided into three and also equally divided instead of the unequally divided capacitance loading elements in the first embodiment. A shape and dimensions of the capacitance loading elements 46, 47, and 48 before the division are set to be comparable with those of the capacitance loading element 40 in the comparative example in FIGS. 16A to 16D. The helical element 70 is connected, for example, to the capacitance loading element 48 at a front position. The other configuration is similar to the above-referenced first embodiment.

Fourth Embodiment

Figure 4:
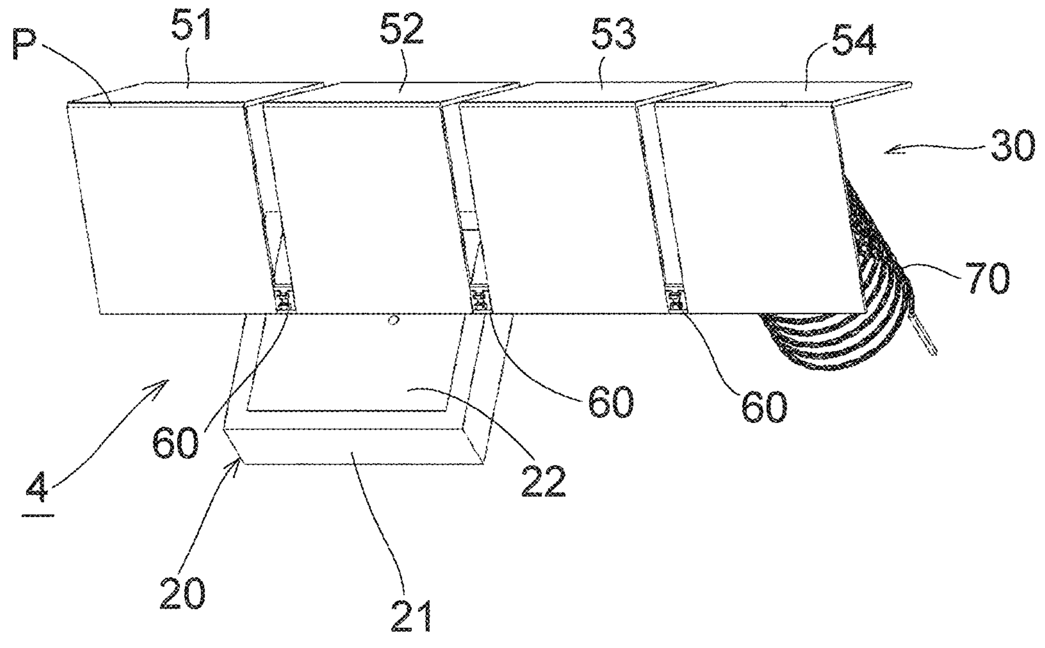
FIG. 4 is a schematic perspective view illustrating a fourth embodiment.

FIG. 4 is a schematic perspective view of an antenna device according to a fourth embodiment, in which an antenna device 4 includes capacitance loading elements 51, 52, 53, and 54 that have been divided into four and also equally divided instead of the unequally divided capacitance loading elements in the first embodiment. A shape and dimensions of the capacitance loading elements 51, 52, 53, and 54 before the division are set to be comparable with those of the capacitance loading element 40 in the comparative example in FIGS. 16A to 16D. The helical element 70 is connected, for example, to the capacitance loading element 54 at a front position. The other configuration is similar to the above-referenced first embodiment.

Fifth Embodiment

Figure 5:
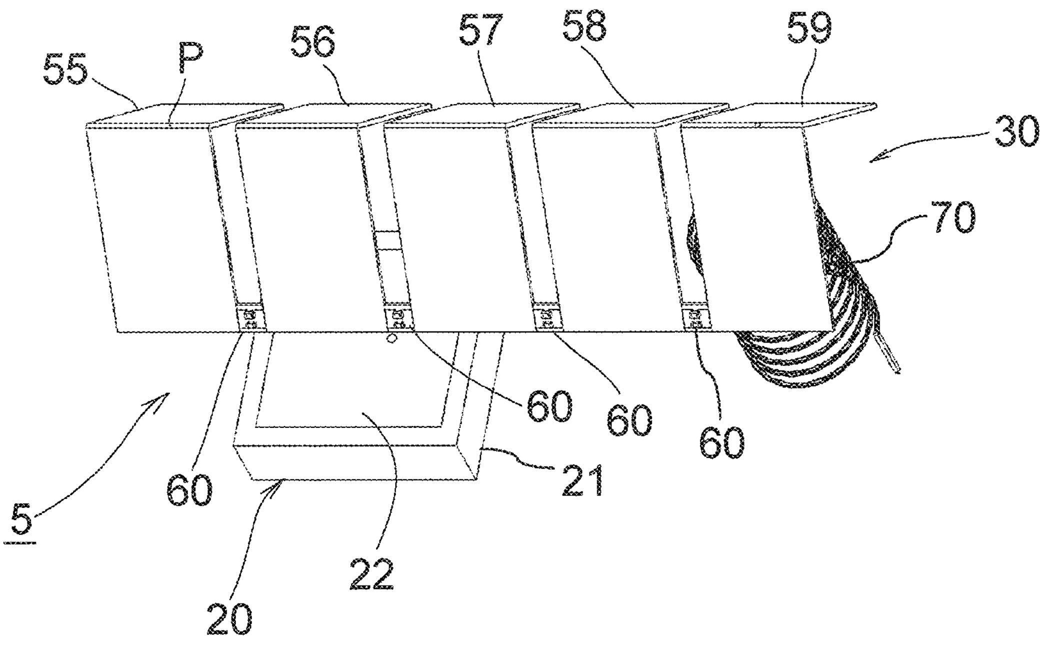
FIG. 5 is a schematic perspective view illustrating a fifth embodiment.

FIG. 5 is a schematic perspective view of an antenna device according to a fifth embodiment, in which an antenna device 5 includes capacitance loading elements 55, 56, 57, 58, and 59 that have been divided into five and also equally divided instead of the unequally divided capacitance loading elements in the first embodiment. A shape and dimensions of the capacitance loading elements 55, 56, 57, 58, and 59 before the division are set to be comparable with those of the capacitance loading element 40 in the comparative example in FIGS. 16A to 16D. The helical element 70 is connected, for example, to the capacitance loading element 59 at a front position. The other configuration is similar to the above-referenced first embodiment.

Figure 8:
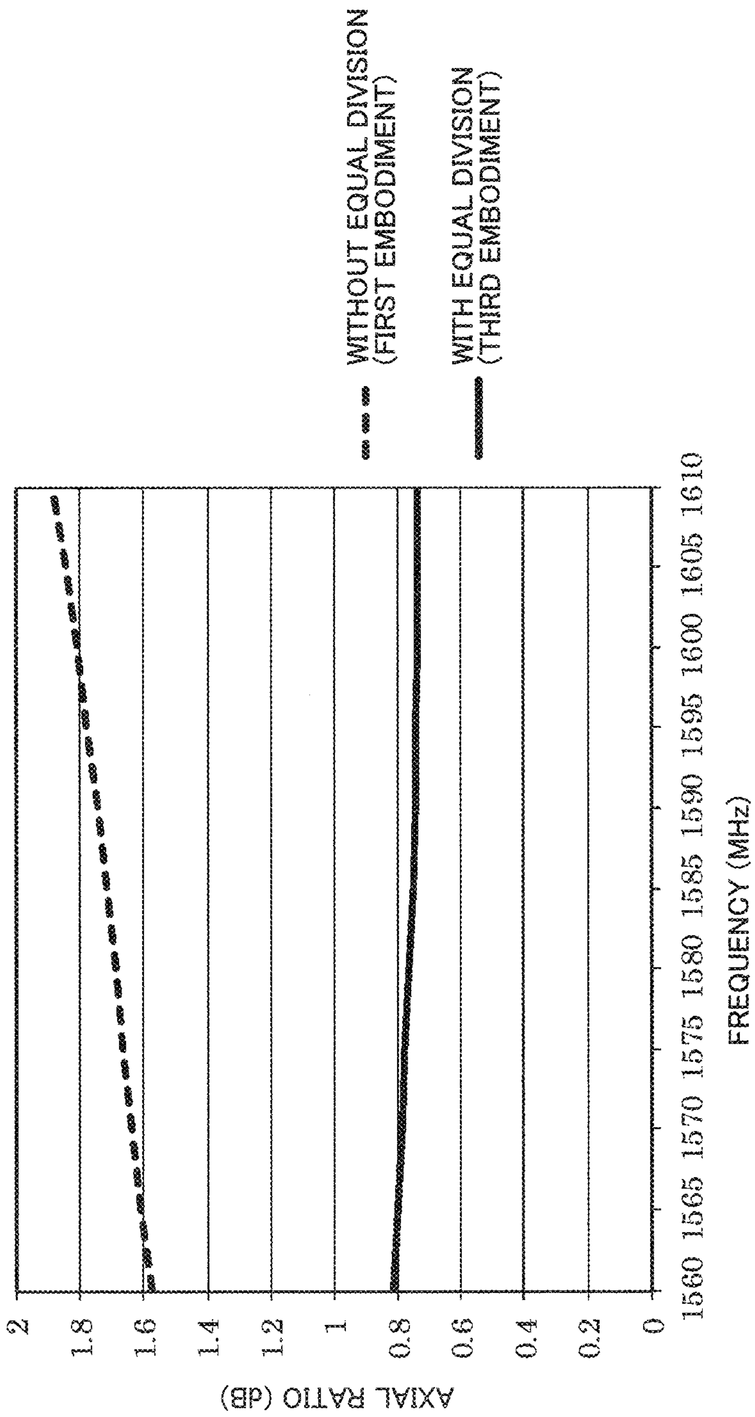
FIG. 8 is a characteristic diagram based on a simulation illustrating a relationship between the frequency and the axial ratio of the antenna device when the capacitance loading element is equally divided in the front-rear direction and when the capacitance loading element is not equally divided while the number of divided pieces is the same.

FIG. 8 is a characteristic diagram based on a simulation illustrating a relationship between the frequency (MHz) and the axial ratio (dB) of the antenna device when the capacitance loading element is equally divided in the front-rear direction (divided into three) (third embodiment in FIG. 3) and when capacitance loading element is not equally divided while the number of divided pieces is the same (the first embodiment in FIG. 1). When the capacitance loading elements 46, 47, and 48 that have been equally divided in the front-rear direction are arranged separately in the front-rear direction, the electrical length of each of the divided capacitance loading elements 46, 47, and 48 in the front-rear direction becomes all the same as compared with a case where the capacitance loading element is not equally divided. In the case of the first embodiment, the difference between the electrical length in the front-rear direction and the electrical length in the left-right direction fluctuates with regard to each of the capacitance loading elements 41, 42, and 43 that are not equally divided. However, according to the third embodiment, the difference between the electrical length in the front-rear direction and the electrical length in the left-right direction becomes all comparable to each other with regard to each of the equally divided capacitance loading elements 46, 47, and 48. For this reason, as illustrated in FIG. 8, when the capacitance loading elements 46, 47, and 48 that have been equally divided in the front-rear direction are disposed, the axial ratio decreases as compared with a case where the capacitance loading elements that are not equally divided are disposed, and transmission and/or reception of circularly polarized waves may be more satisfactorily performed.

Figure 9:
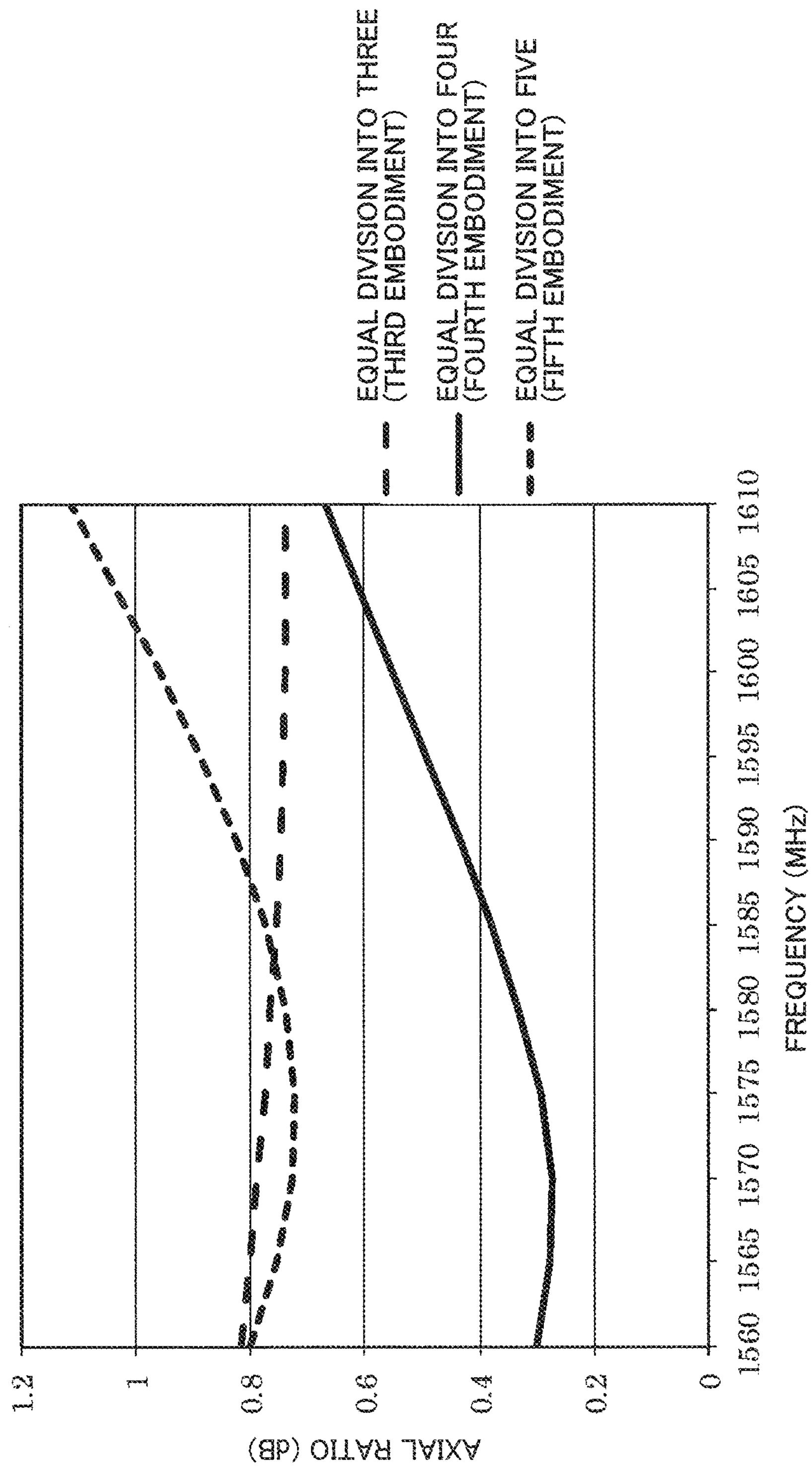
FIG. 9 is a characteristic diagram based on a simulation illustrating a relationship between the frequency of the antenna device and the axial ratio when the capacitance loading element is equally divided in the front-rear direction by different numbers of divisions.

FIG. 9 is a characteristic diagram based on a simulation illustrating a relationship between the frequency (MHz) and the axial ratio (dB) of the antenna device when the capacitance loading element is equally divided in the front-rear direction by different numbers of divisions (3 to 5). When the capacitance loading elements 51, 52, 53, and 54 that have been equally divided into four in the front-rear direction are separately arranged as in the fourth embodiment in FIG. 4 to set the difference between the electrical length in the front-rear direction and the electrical length in the left-right direction of each of the capacitance loading elements 51, 52, 53, and 54 as approximately zero (the electrical length in the front-rear direction and the electrical length in the left-right direction are substantially matched with each other), the axial ratio further decreases as compared with a case where the difference is not set as approximately zero (the third embodiment in FIG. 3 where the capacitance loading element is equally divided into three in the front-rear direction or the fifth embodiment in FIG. 5 where the capacitance loading element is equally divided into five). In a case where physical lengths are the same, an electrical length in a direction including a bent part or a warped part of the capacitance loading element becomes shorter than an electrical length in a flat direction. For this reason, the length of each of the capacitance loading elements 51, 52, 53, and 54 along the left-right direction is set to be longer than the length of each of the capacitance loading elements 51, 52, 53, and 54 in the front-rear direction according to the fourth embodiment in FIG. 4.

In a case where the length of each of the divided capacitance loading elements in the left-right direction varies or a case where the angle defined by the slant faces on both sides of the ridge line changes, it is sufficient when the difference between the electrical length in the front-rear direction and the electrical length in the left-right direction is set to be small with regard to each of the capacitance loading elements.

Sixth Embodiment

Figure 10:
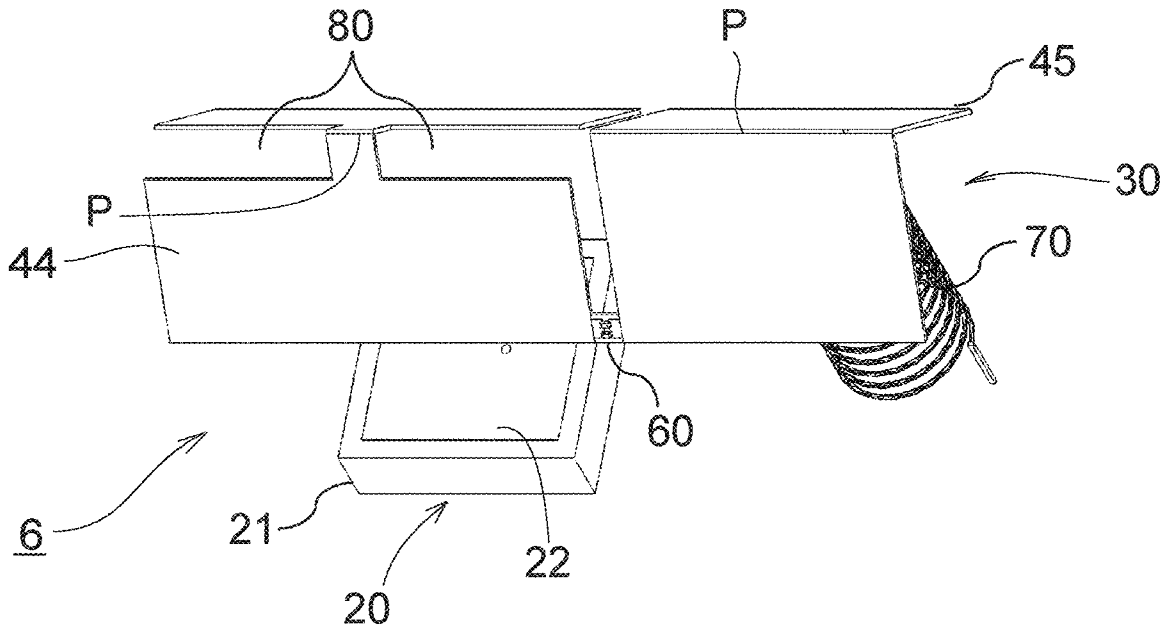
FIG. 10 is a schematic perspective view illustrating a sixth embodiment.

FIG. 10 is a schematic perspective view of an antenna device according to a sixth embodiment, in which an antenna device 6 is obtained by forming a pair of slit-like cutout parts 80 in the capacitance loading element 44 that has the longer length in the front-rear direction among the capacitance loading elements 44 and 45 as illustrated in the second embodiment. The capacitance loading element 44 has the ridge line P in the front-rear direction, and so as to include an extended line of the ridge line P in side edges (a front edge and a rear edge) on both sides of the capacitance loading element 44 in the front-rear direction, the slit-like cutout parts 80 are respectively formed from the side edges towards an inward side (the slit-like cutout part 80 is formed from the front edge of the capacitance loading element 44 towards the rear, and the slit-like cutout part 80 is formed from the rear edge of the capacitance loading element 44 towards the front). A shape and dimensions of the capacitance loading elements 44 and 45 before the division are set to be comparable with those of the capacitance loading element 40 in the comparative example in FIGS. 16A to 16D. The other configuration is similar to the above-referenced second embodiment.

Seventh Embodiment

Figure 11:
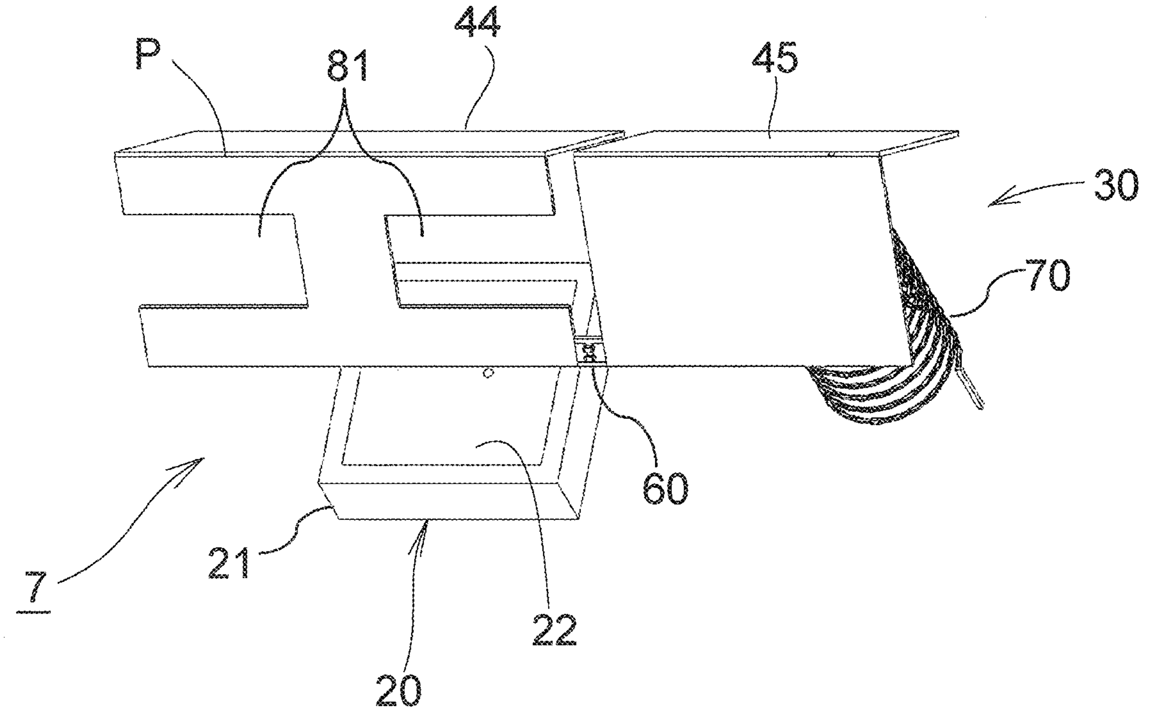
FIG. 11 is a schematic perspective view illustrating a seventh embodiment.

FIG. 11 is a schematic perspective view of an antenna device according to a seventh embodiment, in which an antenna device 7 is obtained by forming a pair of slit-like cutout parts 81 in the side edges (the front edge and the rear edge) on both sides in the front-rear direction of the capacitance loading element 44 that has the longer length in the front-rear direction (longitudinal direction), and the positions of the slit-like cutout parts 81 are positions out of the ridge line P of the capacitance loading element 44 (slant face on the right side). A shape and dimensions of the capacitance loading elements 44 and 45 before the division are set to be comparable with those of the capacitance loading element 40 in the comparative example in FIGS. 16A to 16D. The other configuration is similar to the above-referenced second embodiment. A configuration may also be adopted in which one of the slit-like cutout parts 81 is arranged on the left side of the capacitance loading element 44, and the other one of the slit-like cutout parts 81 is arranged on the right side.

Figure 12:
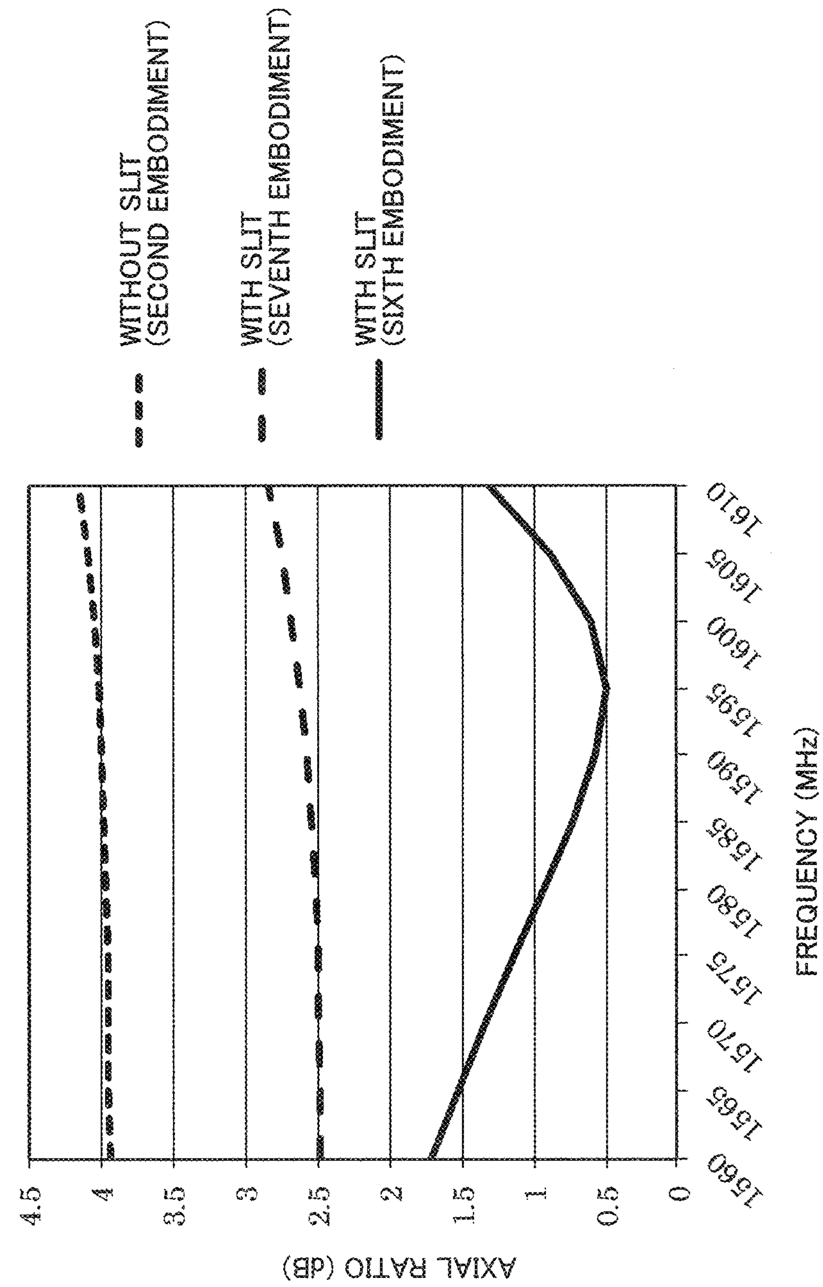
FIG. 12 is a characteristic diagram based on a simulation illustrating a relationship between the frequency and the axial ratio of the antenna device when the capacitance loading element includes a slit-like cutout part and when the capacitance loading element does not include the slit-like cutout part.

FIG. 12 is a characteristic diagram based on a simulation illustrating a relationship between the frequency (MHz) and the axial ratio (dB) in the case of the antenna device 6 of the sixth embodiment in which the capacitance loading element 44 has the slit-like cutout parts 80 and the case of the antenna device 7 of the seventh embodiment in which the capacitance loading element 44 has the slit-like cutout parts 81 in contrast with a case where the capacitance loading element does not have the slit-like cutout parts (equivalent to the second embodiment where the capacitance loading element is divided into two). The capacitance loading element 44 has the slit-like cutout parts 80 or the slit-like cutout parts 81 that are formed by being cut out from the side edges on both sides in the front-rear direction (in other words, the side edges along the left-right direction) towards the inward side. Thus, the electrical length along the side edge of the capacitance loading element 44 in the left-right direction may be increased, and the difference between the electrical length in the left-right direction and the electrical length in the front-rear direction of the capacitance loading element 44 is decreased. For this reason, in the case of the sixth and seventh embodiments in which the slit-like cutout parts 80 and 81 are included, the axial ratio is decreased as compared with the case where the slit-like cutout parts are absent. According to the seventh embodiment in FIG. 11, the slit-like cutout parts 81 are located only on the right side of the capacitance loading element 44. When the slit-like cutout parts 81 do not exist in the above (in the vicinity of the position of the ridge line P) in this manner, the difference between the electrical lengths in the left-right direction and the front-rear direction of the capacitance loading element 44 is not decreased as compared with a case where the slit-like cutout parts 80 exist in the above as in the sixth embodiment in FIG. 10. For this reason, as illustrated in FIG. 12, the axial ratio is not decreased in the case of the seventh embodiment as much as the sixth embodiment.

In the case of the capacitance loading elements that have been divided into two in FIG. 10 and FIG. 11, since the electrical length in the front-rear direction of the capacitance loading element is longer than the electrical length in the left-right direction of the capacitance loading element, for example, provision of the slit-like cutout parts in the capacitance loading element 44 in the left-right direction (the electrical length of the capacitance loading element 44 in the front-rear direction is further increased) leads to increase in the axial ratio, which is not preferable.

Eighth Embodiment

Figure 13:
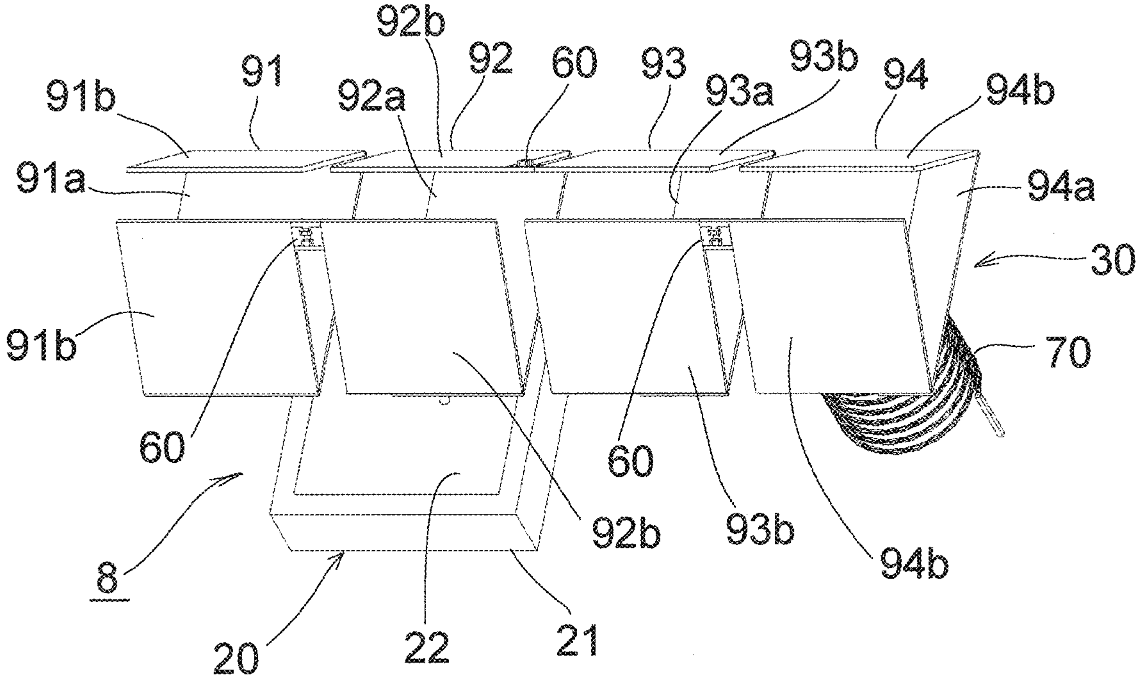
FIG. 13 is a schematic perspective view illustrating an eighth embodiment.

FIG. 13 is a schematic perspective view of an antenna device according to an eighth embodiment, in which an antenna device 8 includes capacitance loading elements 91, 92, 93, and 94 that have been equally divided into four in the front-rear direction (longitudinal direction). The respective capacitance loading elements 91, 92, 93, and 94 are obtained by bending slanted parts 91*b*, 92*b*, 93*b*, and 94*b* to be formed on both sides of bottom coupling parts 91*a*, 92*a*, 93*a*, and 94*a* so as to include clearances in respective upper parts. The slanted parts 91*b*, 92*b*, 93*b*, 94*b* on left and right form chevron-shaped slant faces that are slanted on the left side and the right side. The filter 60 are provided between upper ends on the right side of the slanted parts 91*b* and 92*b* and the slanted parts 93*b* and 94*b*, and the filter 60 is provided between upper ends on the left side of the slanted parts 92*b* and 93*b*. The helical element 70 is connected to the capacitance loading element 94. The other configuration is similar to the above-referenced fourth embodiment.

In accordance with the eighth embodiment, when the capacitance loading elements 91, 92, 93, and 94 that have been equally divided into four are used, action effects pursuant to the above-referenced fourth embodiment are attained.

Ninth Embodiment

Figure 14:
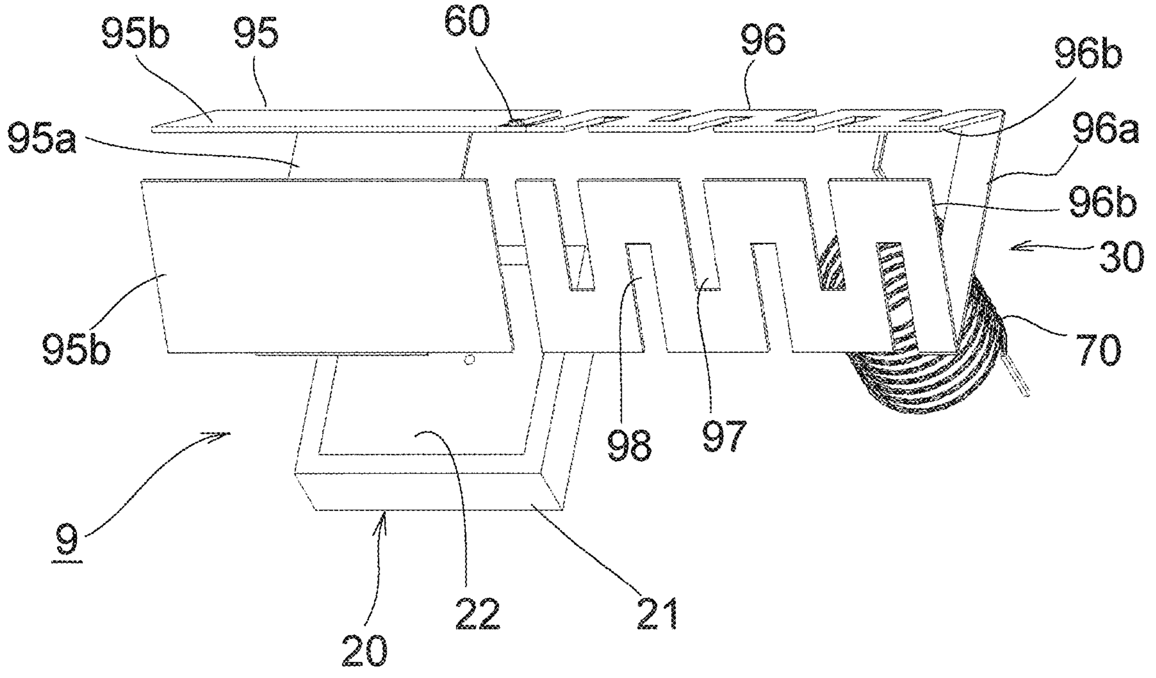
FIG. 14 is a schematic perspective view illustrating a ninth embodiment.

FIG. 14 is a schematic perspective view of an antenna device according to a ninth embodiment, in which an antenna device 9 includes capacitance loading elements 95 and 96 that have been divided into two in the front-rear direction (longitudinal direction). In the capacitance loading element 95, slanted parts 95*b* that become chevron-shaped slant faces are respectively formed by bending on both sides of a bottom coupling part 95*a* so as to include a clearance in an upper part. In the capacitance loading element 96, slanted parts 96*b* that become chevron-shaped slant faces are respectively formed by bending on both sides of a bottom coupling part 96*a* so as to include a clearance in an upper part, and furthermore, slit-like cutout parts 97 and 98 are alternately formed in upper hems and lower hems of the slanted parts 96*b*. As a result, the slanted parts 96*b* of the capacitance loading element 96 become like a meander (meandering shape). The filter 60 mutually connects upper ends of the slanted parts 95*b* and 96*b* on the left side of the capacitance loading elements 95 and 96. The helical element 70 is connected to the capacitance loading element 96. The other configuration is similar to the above-referenced first embodiment, and action effects pursuant to the first embodiment are attained.

Tenth Embodiment

Figure 15:
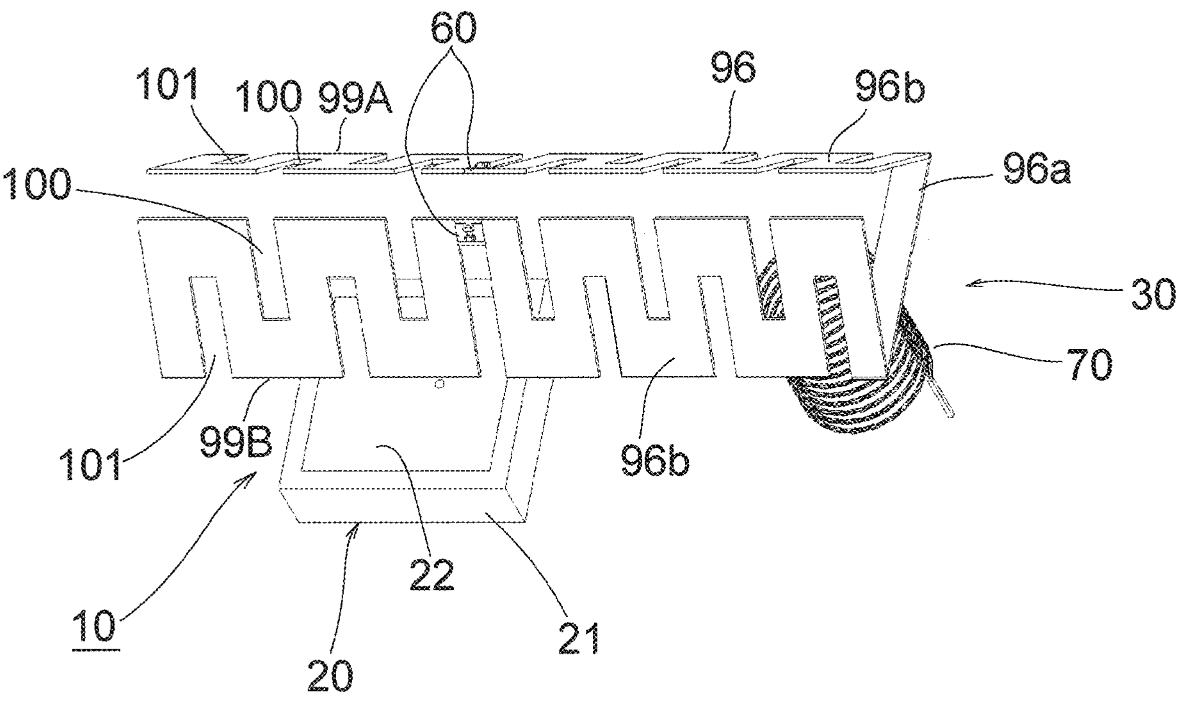
FIG. 15 is a schematic perspective view illustrating a tenth embodiment.
Figure 16A:
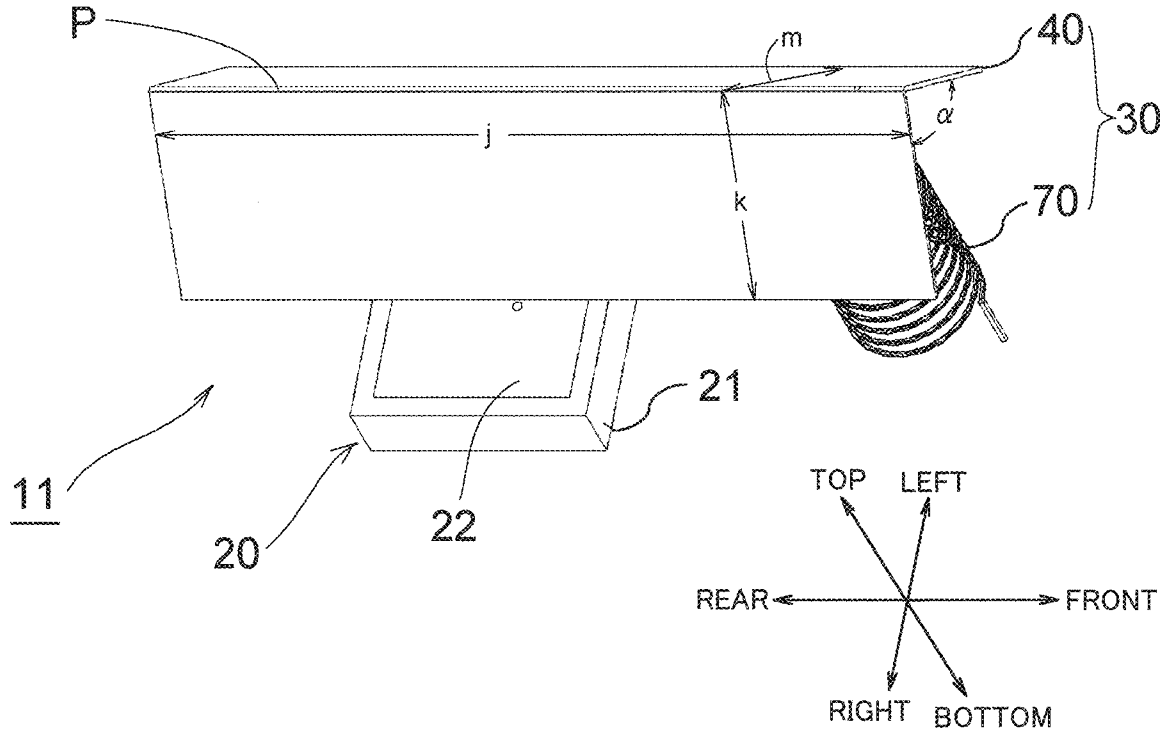
FIG. 16A is a schematic perspective view illustrating a comparative example of the antenna device when the capacitance loading element is not divided in the front-rear direction.
Figure 16B:
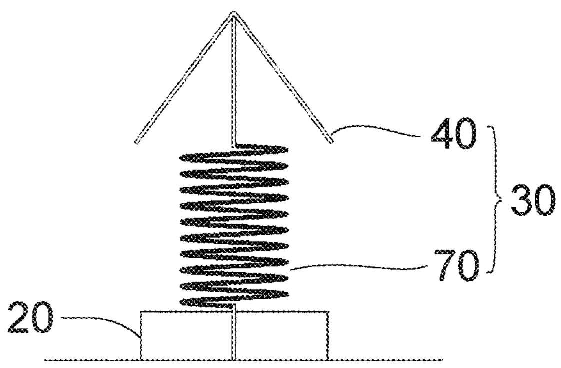
FIG. 16B is a front view when the comparative example is observed from the front.
Figure 16C:
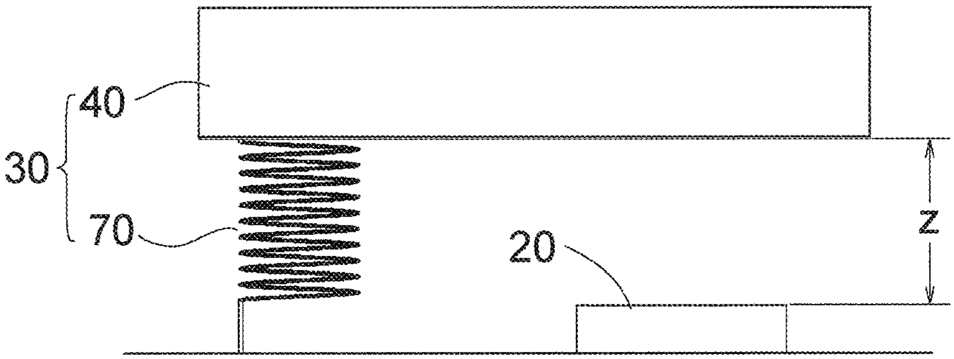
FIG. 16C is a side view illustrating a left side when facing the front of the comparative example.
Figure 16D:
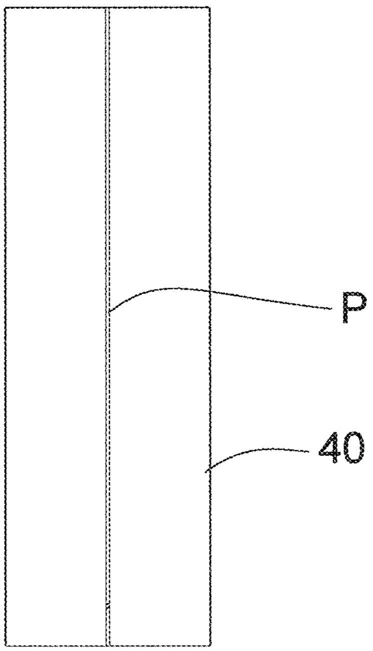
FIG. 16D is a plane view when the comparative example is observed from the above.
Figure 17:
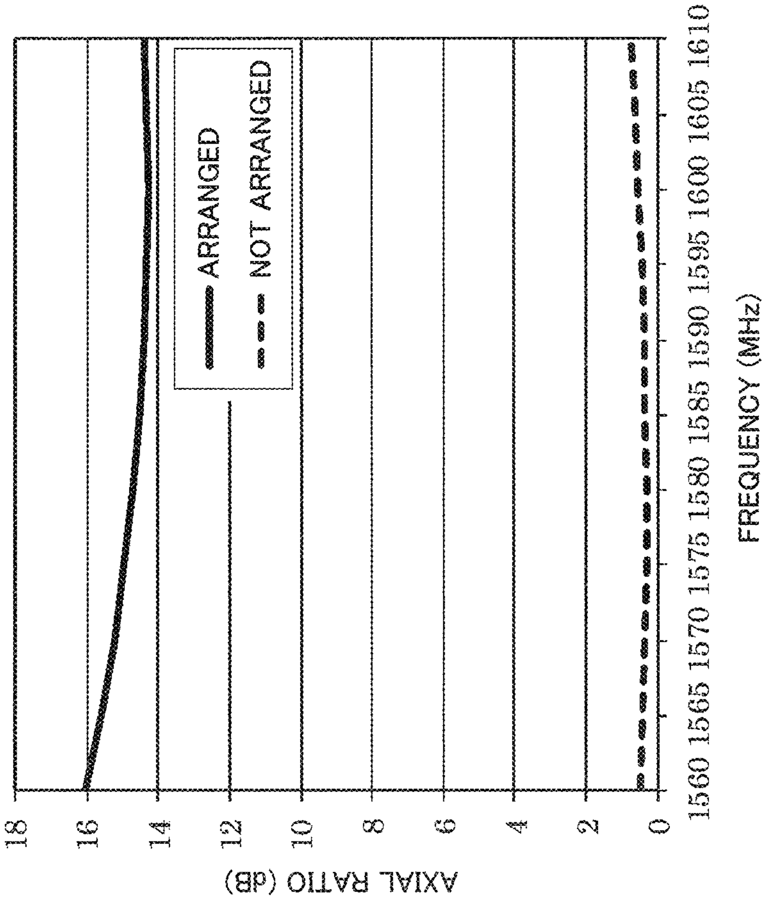
FIG. 17 is a characteristic diagram based on a simulation illustrating a relationship between the frequency and the axial ratio of the antenna device when the capacitance loading element is arranged above the patch antenna and when the capacitance loading element is not arranged.

FIG. 15 is a schematic perspective view of an antenna device according to a tenth embodiment, in which an antenna device 10 includes capacitance loading elements 99A and 99B divided into left and right on the rear side of the capacitance loading element 96 illustrated in the ninth embodiment. The capacitance loading elements 99A and 99B are like a meander (meandering shape) in which slit-like cutout parts 100 and 101 are alternately formed in upper hems and lower hems. The capacitance loading elements 99A and 99B form chevron-shaped slant faces on left and right and are connected to each other via the filter 60 at upper ends of the slanted parts 96*b* on left and right of the capacitance loading element 96. The other configuration is similar to the above-referenced ninth embodiment, and action effects pursuant to the ninth embodiment are attained.

A plurality of embodiments have been described above, but various modifications of the respective components and the respective processing processes of the respective embodiments may be made within the scope of the gist of the present invention as will be understood by the person skilled in the art. For example, the following modified examples are considerable.

In the respective embodiments, the position of the helical element 70 corresponding to the component of the antenna 30 for AM/FM broadcast reception is not limited to the front, and the helical element may be connected to the capacitance loading element at the rear position and located in front of the patch antenna 20. Furthermore, the helical element may be offset in the left-right direction orthogonal to the front-rear direction (may be deviated in the left-right direction).

In the respective embodiments, the position of the filter 60 that mutually connects the capacitance loading elements is not limited to the ends of the capacitance loading elements and may be a position where the capacitance loading elements can be mutually connected, and the number of filters is not limited to 1, and plural pieces may also be used. Furthermore, in a case where it is sufficient when the desired axial ratio is not so low, a configuration may also be adopted in which the respective divided capacitance loading elements are connected by a conductive wire instead of the filter 60.

The filter 60 is used to mutually connect the respective capacitance loading elements according to the respective embodiments, but a filter that becomes high impedance in the frequency band where the patch antenna 20 operates may be used instead of the filter 60 or together with the filter 60.

In the sixth embodiment in FIG. 10 and the seventh embodiment in FIG. 11, the slit-like cutout parts are formed in both the front edge and the rear edge of the capacitance loading element 44 towards the inward side in the front-rear direction, but improvement effects in the axial ratio are attained also in a case where the slit-like cutout part is formed in only either the front edge or the rear edge. The sixth and seventh embodiments illustrate the case where the slit-like cutout parts are provided in a case where the capacitance loading element is divided into two, but there are also cases where the axial ratio may be improved when the slit-like cutout part is provided in a case where the capacitance loading element is not divided and a case where the capacitance loading element is divided into three or more. In addition, the slit-like cutout parts may be provided in a plurality of capacitance loading elements.

According to the respective embodiments, the case has been exemplified where the capacitance loading element is chevron-shaped having the ridge line, but the configuration is not limited to the chevron shape and may be a flat plate or the like.

REFERENCE SIGNS LIST

1 TO 11 ANTENNA DEVICE
20 PATCH ANTENNA
30 ANTENNA FOR AM/FM BROADCAST RECEPTION
40 TO 48, 51 TO 59 CAPACITANCE LOADING ELEMENT
60 FILTER
70 HELICAL ELEMENT
80, 81 SLIT-LIKE CUTOUT PART

What is claimed is:

1. An antenna device comprising:
a first antenna configured to operate in a first frequency band; and
a second antenna configured to operate in a second frequency band which is different from the first frequency band, wherein
the second antenna includes a capacitance loading element that includes a part overlapping with the first antenna when viewed from an upper side, and
at least a part of the capacitance loading element includes a meandering-shaped portion.

2. The antenna device according to claim 1, wherein
the meandering-shaped portion includes a cutout part in an upper-lower direction.

3. The antenna device according to claim 2, wherein
the capacitance loading element includes at least two divided members, and
at least one of the divided members includes the meandering-shaped portion.

4. The antenna device according to claim 3, wherein
the first antenna is a patch antenna, and
the meandering-shaped portion overlaps with at least a part of the patch antenna when viewed from a lateral side.

5. The antenna device according to claim 4, wherein
when viewed from the lateral side, an interval between a radiation surface of the patch antenna and a lower end of the capacitance loading element is shorter than 0.25 times of a wavelength in the first frequency band.

6. The antenna device according to claim 3, wherein
the divided members are connected to each other by a filter or a conductive wire.

7. The antenna device according to claim 6, wherein
the filter or the conductive wire is configured to have a high impedance in the first frequency band.

8. The antenna device according to claim 2, wherein
the first antenna is a patch antenna, and
the meandering-shaped portion overlaps with at least a part of the patch antenna when viewed from a lateral side.

9. The antenna device according to claim 8, wherein
when viewed from the lateral side, an interval between a radiation surface of the patch antenna and a lower end of the capacitance loading element is shorter than 0.25 times of a wavelength in the first frequency band.

10. The antenna device according to claim 2, wherein
the capacitance loading element has a chevron-shape when viewed from a front side or a rear side,
the capacitance loading element includes a first slanted part and a second slanted part which define the chevron-shape, and
an upper edge of the first slanted part and an upper edge of the second slanted part are separated from each other.

11. The antenna device according to claim 1, wherein
the capacitance loading element includes at least two divided members, and
at least one of the divided members includes the meandering-shaped portion.

12. The antenna device according to claim 11, wherein
the divided members are connected to each other by a filter or a conductive wire.

13. The antenna device according to claim 12, wherein
the filter or the conductive wire is configured to have a high impedance in the first frequency band.

14. The antenna device according to claim 11, wherein
the first antenna is a patch antenna, and
the meandering-shaped portion overlaps with at least a part of the patch antenna when viewed from a lateral side.

15. The antenna device according to claim 14, wherein
when viewed from the lateral side, an interval between a radiation surface of the patch antenna and a lower end of the capacitance loading element is shorter than 0.25 times of a wavelength in the first frequency band.

16. The antenna device according to claim 1, wherein
the first antenna is a patch antenna, and
the meandering-shaped portion overlaps with at least a part of the patch antenna when viewed from a lateral side.

17. The antenna device according to claim 16, wherein
when viewed from the lateral side, an interval between a radiation surface of the patch antenna and a lower end of the capacitance loading element is shorter than 0.25 times of a wavelength in the first frequency band.

18. The antenna device according to claim 1, wherein
the capacitance loading element has a chevron-shape when viewed from a front side or a rear side,
the capacitance loading element includes a first slanted part and a second slanted part which define the chevron-shape, and
an upper edge of the first slanted part and an upper edge of the second slanted part are separated from each other.

19. The antenna device according to claim 1, wherein
the first antenna is an antenna for a satellite, and
the second antenna is an antenna for a radio broadcasting.

* * * * *